United States Patent
Weber

(10) Patent No.: US 7,463,419 B2
(45) Date of Patent: Dec. 9, 2008

(54) OPTOELECTRONIC SENSOR

(75) Inventor: Helmut Weber, Emmendingen (DE)

(73) Assignee: Sick AG, Waldkirch (DE)

( * ) Notice: Subject to any disclaimer, the term of this patent is extended or adjusted under 35 U.S.C. 154(b) by 125 days.

(21) Appl. No.: 11/337,751

(22) Filed: Jan. 23, 2006

(65) Prior Publication Data

US 2006/0169875 A1 Aug. 3, 2006

(30) Foreign Application Priority Data

Jan. 31, 2005 (DE) .................. 10 2005 004 419

(51) Int. Cl.
*G02B 5/18* (2006.01)

(52) U.S. Cl. .................. 359/571; 359/572; 359/573; 359/574; 359/575

(58) Field of Classification Search .......... 359/571–575
See application file for complete search history.

(56) References Cited

U.S. PATENT DOCUMENTS

| 4,958,067 | A | | 9/1990 | Nakatomi et al. |
| 5,122,903 | A | * | 6/1992 | Aoyama et al. ............ 359/565 |
| 2001/0045512 | A1 | | 11/2001 | Brent |
| 2005/0035277 | A1 | | 2/2005 | Matsuyama et al. |
| 2005/0094128 | A1 | * | 5/2005 | Carver et al. ................. 356/71 |
| 2006/0233495 | A1 | * | 10/2006 | Ide et al. ........................ 385/73 |
| 2006/0279822 | A1 | * | 12/2006 | Kmeta et al. .................. 359/15 |

FOREIGN PATENT DOCUMENTS

| DE | 196 19 478 A1 | 11/1997 |
| DE | 198 58 769 A1 | 6/2000 |
| DE | 100 63 899 A1 | 7/2002 |
| DE | 102 14 566 A1 | 10/2003 |
| DE | 103 08 285 A1 | 9/2004 |
| EP | 0283 002 B1 | 2/1994 |
| EP | 0 548 848 B1 | 11/1995 |
| EP | 1 010 992 A2 | 6/2000 |
| EP | 1 235 054 A2 | 8/2002 |
| EP | 1 010 992 A3 | 3/2003 |
| EP | 1 365 214 A1 | 11/2003 |
| EP | 1 512 992 A1 | 3/2005 |
| JP | 2004 170 128 | 6/2004 |
| WO | WO 03/083943 A2 | 10/2003 |

* cited by examiner

*Primary Examiner*—Jordan M. Schwartz
*Assistant Examiner*—James C Jones
(74) *Attorney, Agent, or Firm*—Harness, Dickey & Pierce, P.L.C.

(57) ABSTRACT

The invention relates to an optoelectronic sensor comprising an integrated arrangement of a plurality of light emitting diodes arranged in the region of an optical receiving system for the illumination of a sensing region, with beam-shaping optical elements being associated with the light emitting diodes. The beam-shaping optical elements have optical properties which differ from one another and are dependent on their relative position to the optical receiving system. Furthermore, the beam-shaping optical elements have a wedge shape, with in each case precisely one wedge element or regions of up to four adjacent wedge elements being associated with the light emitting diodes.

14 Claims, 3 Drawing Sheets

OPTOELECTRONIC SENSOR

CROSS-REFERENCE TO RELATED APPLICATIONS

This application claims the benefit of German Patent Application No. 10 2005 004 419.0, filed on Jan. 31, 2005. The disclosure of the above application is incorporated herein by reference.

FIELD AND BACKGROUND OF THE INVENTION

The invention relates to an optoelectronic sensor comprising an integrated arrangement of a plurality of light emitting diodes arranged in the region of an optical receiving system for the illumination of a sensing region, with beam-shaping optical elements being associated with the light emitting diodes.

Optoelectronic sensors are known from the prior art and are used, for example, both for object sensing and in particular for the sensing of codes. In this process, simple sensors work without beam-shaping optical elements, which has the consequence that a comparatively large proportion of the light transmitted by the light emitting diodes does not reach the sensing region so that the illumination of the sensing region ultimately does not take place in a very efficient manner.

Sensors for demanding applications improved with respect to sensors of this type are, as already mentioned above, fitted with beam-shaping optical elements in front of the light emitting diodes. These beam-shaping optical elements ensure that the light radiated from the light emitting diodes reaches the sensing region as completely as possible so that increased efficiency can be achieved here with the illumination.

However, despite the provision of beam-shaping elements, it is not yet possible with known optoelectronic sensors to generate respectively desired illumination profiles in the sensing region which are required for specific applications. It is, for example, desirable in many applications to ensure an illumination of the sensing region which is as homogeneous as possible. In other applications, however, a more intensive illumination of the sensing region at its edges can also be desired (peripheral increase). Furthermore, it is often desirable, for example with optoelectronic sensors having light emitting diodes arranged over a rectangular area to direct the light radiated from these light emitting diodes as completely as possible to a square sensing region.

Illumination profiles of this type with their respective characteristics cannot be generated or can only be generated in inadequate quality by optoelectronic sensors of the initially named kind.

SUMMARY OF THE INVENTION

An object of the invention consists of designing an optoelectronic sensor of the initially named kind such that respectively desired illumination profiles can be generated in the sensing region, with a maximum efficiency simultaneously being achieved in that as much as possible of the whole light quantity radiated by the light emitting diodes is directed to the sensing region.

This object is satisfied in accordance with the invention and in particular in that the beam-shaping optical elements have:

optical properties which differ from one another and which are dependent on their relative position to the optical receiving system; and furthermore have a wedge shape, with precisely one wedge element or regions of up to four adjacent wedge elements being respectively associated with the light emitting diodes.

In accordance with the invention, respective individual beam-shaping elements are associated with the light emitting diodes, in particular with all the light emitting diodes of the optoelectronic sensor, and are suitable to radiate the light transmitted by the respective light emitting diode in the desired direction with respect to the respective light emitting diode. Light in the sense of the invention is generally also to be understood as radiation in the non-visible range, that is e.g. IR or UV radiation. In accordance with the invention, the individual beam-shaping optical elements can therefore be made in their design and/or position relative to the optical receiving system of the optoelectronic sensor such that the respective desired illumination profile is adopted in the sensing region by overlap of the light radiated by all light emitting diodes. The light transmitted from each light emitting diode can therefore be directed as completely and precisely as possible to that position of the sensing region at which it is required so that, for example, illumination profiles with a homogeneous illumination or illumination profiles with peripheral increase can be generated without problem. It is equally possible without difficulty in accordance with the invention to direct light radiated from a rectangular field of light emitting diodes completely onto a square sensing region. Any other desired characteristics of illumination profiles can likewise be generated in accordance with the invention.

Due to the wedge-shaped design of the beam-shaping optical elements in accordance with the invention, the latter can be manufactured comparatively cost-favorably and simply in comparison with spherical lenses or Fresnel lenses so that the total costs of the optoelectronic sensor are not substantially increased by the beam-shaping optical elements designed in accordance with the invention.

In accordance with a variant in accordance with the invention, precisely one wedge element can be respectively associated with one light emitting diode, said wedge element providing the desired beam shaping and beam direction with respect to the respective light emitting diode. Alternatively, however, it is also possible to associate regions of precisely two adjacent wedge elements, or also of up to four adjacent wedge elements with a light emitting diode, which will be explained in more detail in the following by way of example with reference to precisely two adjacent wedge elements.

At least some of the beam-shaping elements in accordance with the invention can be designed such that they deflect the light radiated from the respective light emitting diodes somewhat in the direction of the optical axis of the optical receiving system. This is advantageous since no light emitting diodes can be provided in the region of the optical receiving system so that there is no sufficient illumination in the sensing region disposed directly beneath the optical receiving system or in that region of the sensing region which surrounds the point of intersection between the optical axis of the optical receiving system and the plane of the sensing region. When light is directed directly into the region in accordance with the invention, it can be ensured that this region is also illuminated sufficiently strongly.

For the case that precisely one wedge element is associated with a light emitting diode, the former can be made as a wedge plate with a sloping surface which is provided at the side facing the light emitting diode and/or at the side of the wedge plate remote from the light emitting diode. In order to achieve the respectively required illumination profile, the inclination of the sloping surface of each wedge plate can be matched individually to the relative position between the respectively associated light emitting diode and the optical receiving system in two directions perpendicular to one another. The light transmitted by each light emitting diode can be directed very precisely to the respectively desired position of the sensing region by an individual inclination of the sloping surface of this type.

The inclination of the sloping surface of each wedge plate in two directions perpendicular to one another can also then be set individually in the respectively necessary manner when e.g. regions of two or four mutually adjacent wedge plates are associated with a light emitting diode. With, for example, four mutually adjacent wedge plates, the light emitting diode can then be arranged such that it is located opposite that point at which all four wedge plates adjoin one another.

It is preferred in an economic respect for the wedge element associated with a light emitting diode not to be made as an individual wedge plate, but rather as a section of precisely one wedge strip or wedge ring with a sloping surface which is provided at the side facing the light emitting diode and/or at the side of the wedge strip or wedge ring remote from the light emitting diode. It is of advantage in an embodiment of this type that it is not necessary to produce a number of individual wedge plates, but that one wedge strip or one wedge ring can be arranged such that it is associated with a plurality of light emitting diodes which are arranged along the wedge strip or wedge ring so that ultimately only a section of the wedge strip or wedge ring is associated with each light emitting diode. The optical properties of the wedge strip or wedge ring are constant over its longitudinal extent. The optical properties of a plurality of provided wedge strips or wedge rings among one another, in contrast, differ from one another and are dependent on their relative position to the optical receiving system.

The wedge plate, wedge strip or wedge ring can be aligned with the respectively associated light emitting diode such that the light transmitted by this light emitting diode passes as completely as possible through the sloping surface of the respective wedge plate or of the respective wedge strip or wedge ring. In this manner, the light quantity incident onto the sensing region is maximized.

The wedge element associated with a light emitting diode can also be made as a section of up to four, preferably of precisely two, mutually adjoining wedge strips or wedge rings. It in turn also applies here that the optical properties of the wedge strips or wedge rings are constant over their longitudinal extent, but differ from one another from wedge strip to wedge strip or from wedge ring to wedge ring.

The wedge strips or wedge rings can in this case be aligned with the respectively associated light emitting diode such that approximately half the light transmitted by this light emitting diode passes through the sloping surface of a wedge strip or of a wedge ring and the other half passes through the sloping surface of a further wedge strip or wedge ring. It is thus achieved that the light transmitted by one light emitting diode is divided into two light quantity regions which can undergo different beam shaping. The fact is particularly advantageous with this arrangement that increased efficiency results since the light losses occurring in the wedge stripes or wedge rings are minimized. This will be explained in more detail in connection with the description of the Figures.

It is particularly preferred with the last described embodiment for the sloping surface of each wedge strip or wedge ring to be formed by two sections which extend in parallel to one another and have inclinations differing from one another, with in particular each of the two sections forming approximately half the sloping surface. It is advantageous in this process for the two sections to merge steplessly into one another. This embodiment will also be explained within the framework of the description of the Figures.

An end surface of the wedge plate, of the wedge strip or of the wedge ring having no sloping surfaces can extend perpendicular to the main radiation direction of the light emitting diode. The named end surfaces of all wedge plates, wedge strips or wedge rings can in this case be arranged inside a single plane. If end surfaces of this type are arranged at the side remote from the light emitting diode, the composite of all wedge plates, wedge strips or wedge rings can form a planar front device plate of the sensor in accordance with the invention.

It is particularly preferred for all beam-shaping optical elements to be firmly connected to one another since a complex adjustment of the optical elements relative to one another is omitted in this case. It is particularly advantageous for all beam-shaping optical elements to be formed in a uniform step plate having a plurality of wedge-shaped steps. A step plate of this type, which can be made as a post-processed injected molded part, for example, can be manufactured particularly cost favorably, with all beam-shaping optical elements of an optoelectronic sensor here being able to be manufactured together by means of one single injection procedure.

A plurality of concentric wedge rings can be provided in the step plate, which in particular directly adjoin one another. An arrangement of this type is sensible when the optoelectronic sensor has light emitting diodes arranged in ring form around the optical receiving system. A wedge ring or, alternatively, sections of two adjacent wedge rings, can then be associated with each ring of light emitting diodes. If the light emergence window of the optoelectronic sensor has a rectangular shape and if the light emitting diodes are also arranged in the region of a rectangular surface, it is advantageous for the step plate also to have a rectangular shape, with at least some of the concentric wedge rings only being present incompletely on the step plate in this case. An embodiment of this type will likewise be explained in more detail in the following within the framework of the description of the Figures.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
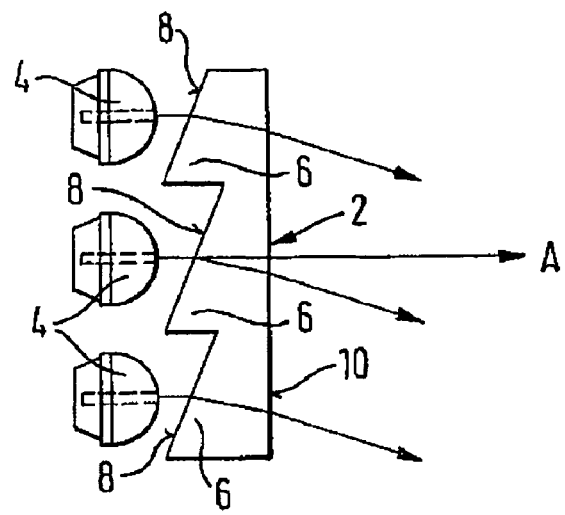
FIG. 1 illustrates a section through wedge elements in accordance with the invention with light emitting diodes arranged in front of them.

FIG. 1 shows a section through a portion of a step plate 2 in accordance with the invention with light emitting diodes 4 arranged in front of the step plate 2. The portion of the step plate 2 shown has a total of three wedge elements in accordance with the invention made as wedge plates 6, with the sloping surfaces 8 of the wedge plates 6 facing the light emitting diodes 4.

The end surfaces 10 of the wedge plates 6 remote from the light emitting diodes 4 and from the sloping surfaces 8 extend perpendicular to the main radiation direction A of the light emitting diodes 4 in a common plane. Accordingly, the step plate 2 can be manufactured from a uniform plate which is only worked on the side facing the light emitting diodes 4 such that the sloping surfaces 8 are formed. The step plate 2 in this case forms an outside planar front device plate of a sensor in accordance with the invention.

The light rays transmitted by the light emitting diodes 4 are refracted a first time on entering into the step plate 2 in the region of the sloping surfaces 8 and a second time on exiting from the step plate 2 in the region of the end surfaces 10 and are thus deflected in a respectively desired direction with respect to the main radiation direction A of the light emitting diodes 4. In this process, the respectively desired deflection can be set by the magnitude of the angle of inclination of the sloping surfaces 8. The inclination of the sloping surfaces 8 can be set both by around axis of inclination extending perpendicular to the plane of the drawing and—where required—around an axis of inclination which extends from top to bottom in the plane of the drawing. A setting of the sloping surface by the last-named axis of inclination is, however, not possible when wedge strips or wedge rings such as have already been explained above are used instead of individual wedge plates.

A setting of the inclination of the sloping surfaces 8 in all directions advantageously makes it possible, on the one hand, to direct the light radiated by the light emitting diodes precisely in the respectively desired direction; on the other hand, such an individual matching of the sloping surfaces 8 to each individual light emitting diode 4 is, however, associated with a high effort. This effort can be reduced by the use of wedge strips or wedge rings, which still always allows a direct deflection of the light radiated from the light emitting diodes 4 sufficient for most applications.

The inclinations of the sloping surfaces 8 can be selected to be different from one another so that a superimposition of the light radiated by all light emitting diodes 4 ultimately results in the respectively desired illumination profile in the sensing region of the optoelectronic sensor.

Figure 2:
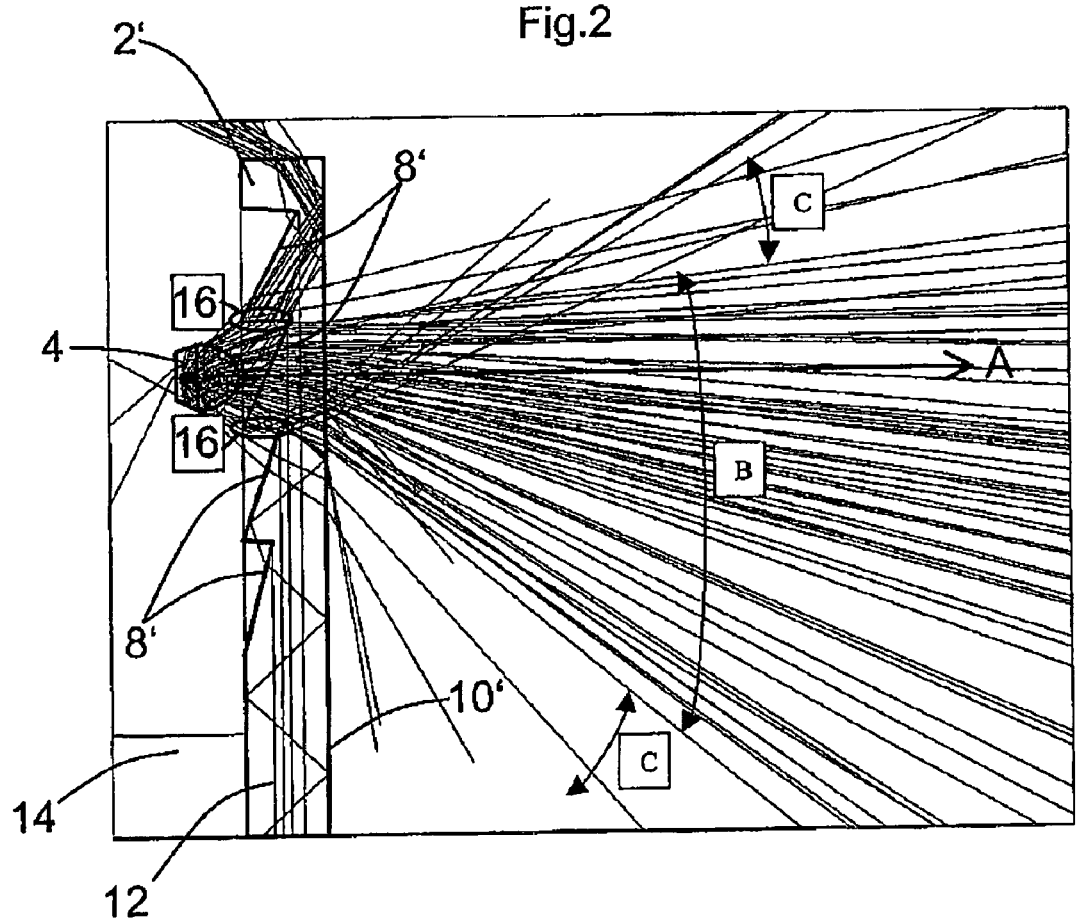
FIG. 2 illustrates a section through a step plate made in accordance with the invention with a light emitting diode arranged in front of a wedge element of the step plate.

FIG. 2 shows a representation which substantially corresponds to the representation in accordance with FIG. 1, with here, however, only one individual light emitting diode 4 being shown by way of example together with the totality of the light rays transmitted by it for reasons of clarity. The step plate 2' in accordance with FIG. 2 has a total of four sloping surfaces 8' which have all different inclinations with respect to the main radiation direction A of the light emitting diode 4. A respective light emitting diode 4 is arranged opposite each sloping surface 8' and, as already mentioned, only one of them is shown in FIG. 2. An optical receiving system 14 is provided adjacent to that region 12 of the step plate 2' which has no sloping surfaces 8'.

The inclination of the sloping surfaces 8' with respect to the end face 10' increases in the embodiment shown from wedge element to wedge element as the distance from the optical receiving system 14 increases so that the light rays transmitted by the light emitting diodes 4 are refracted more strongly as the distance from the optical receiving system 14 increases. Generally, the sloping surfaces 8' can, however, have any desired inclination, in particular also independently of the distance from the optical receiving system 14, in order thus to generate respectively desired illumination profiles.

It is advantageous for the radiation characteristic of the light emitting diodes 4, the magnitude and orientation of the sloping surfaces 8' and the distance between the light emitting diodes 4 and the sloping surfaces 8' to be selected such that the light radiated from a light emitting diode 4 is incident as completely as possible onto the sloping surface 8' associated with it. This criterion applies to the light rays marked with B including a double arrow in FIG. 2. All these light rays emerge from the end face 10' after they have entered into the step plate 2' through the sloping surface 8' associated with the light emitting diode 4.

Some of the radiation transmitted by the light emitting diode 4 is incident in the two regions marked by 16 onto steps which are formed between two adjacent sloping surfaces 8'. The radiation incident onto these two step regions 16 is ultimately lost and cannot be used to irradiate the sensing region. Specifically, a lightguide effect occurs within the step plate 2' with respect to the radiation incident onto the upper step region 16 such that this radiation ultimately emerges from the side of the step plate 2' in an undesired manner. The light portion incident onto the lower step region 16 is reflected through the end surface 10' by the step such that it is ultimately guided past the sensing region to be illuminated. The named radiation portions influenced by the step regions 16 are, however, so small that an optoelectronic sensor with a step plate 2' in accordance with FIG. 2 can nevertheless work in the desired manner in accordance with the invention.

Further radiation portions of the light emitting diode 4 are incident on adjacent sloping surfaces 8' which are not associated with the light emitting diode 4 drawn in FIG. 2. These radiation portions are then refracted by the adjacent sloping surfaces 8' and are directed to a large part in the desired manner to the sensing region. The corresponding light ray regions are marked in FIG. 2 by C including a double arrow.

It can be seen from the course of the totality of the light rays drawn in FIG. 2 that they are substantially refracted somewhat in the direction of the optical receiving system 14, which is sensible since no illumination of the sensing region can take place starting from the region of the optical receiving system 14. Accordingly, in accordance with the invention, the light emitting diodes surrounding the optical receiving system 14 also provide an illumination of the sensing region directly with respect to the optical receiving system 14 due to the sloping surfaces 8' provided in accordance with the invention.

If the step plate 2' in accordance with FIG. 2 is made as a rotationally symmetrical step plate, concentric rings of light emitting diodes 4 can be formed around the optical receiving system 14 and then provide an optimum illumination of the sensing region.

Figure 3:
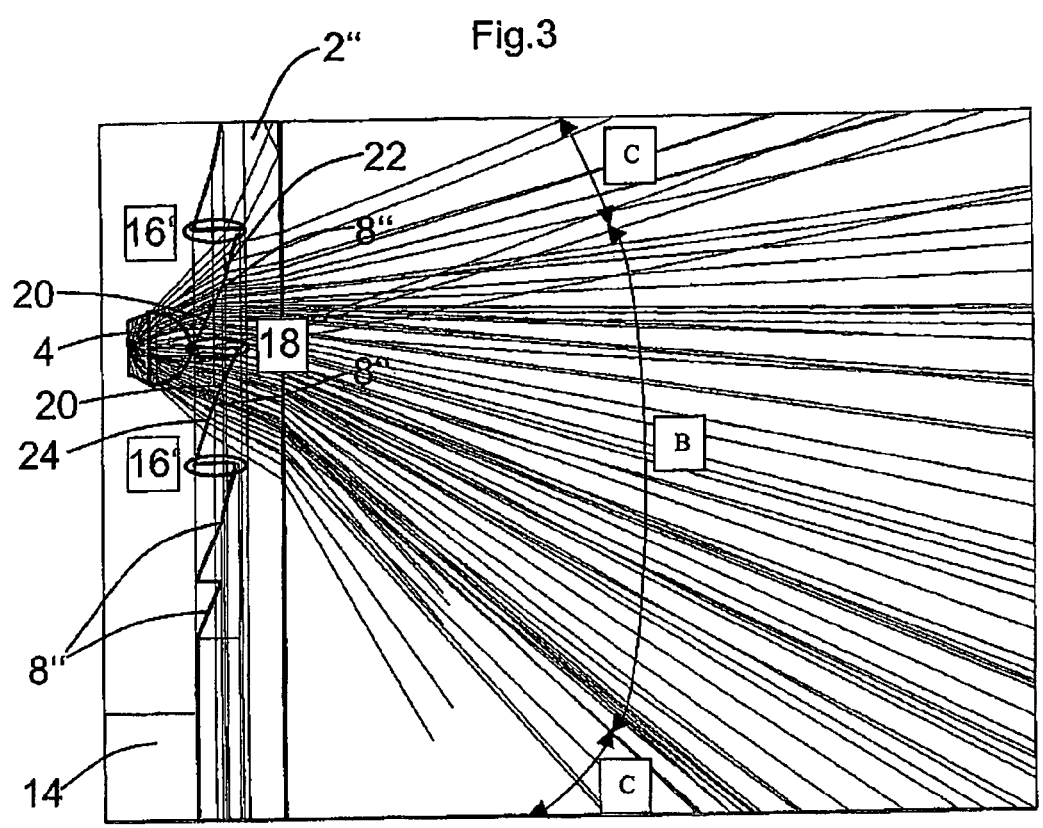
FIG. 3 illustrates a section through a further embodiment of a step plate in accordance with the invention with a light emitting diode arranged in the region of two wedge elements.

FIG. 3 shows an embodiment improved with respect to FIG. 2, wherein the light emitting diode 4 again only shown by way of example is arranged directly opposite a step region 18 such that approximately half of the light radiated by the light emitting diode 4 is in each case incident on adjacent sloping surfaces 8" of the step plate 2".

Since the radiation transmitted by the light emitting diode 4 is directed substantially parallel to the extent of the step in the step region 18, the transmitted radiation is as good as not influenced by the step region 18, which increases the efficiency of the total arrangement.

The sloping surfaces 8″ of the step plate 2″ each have a kink in their central region so that they have different optical properties at each side of the kink. The inclination of the sloping surfaces 8″ is accordingly matched by half to that light emitting diode 4 which is located closest to the respective sloping surface region. With respect to the light emitting diode 4 shown only by way of example in FIG. 3, the two regions 20 are matched to the light emitting diode shown, whereas the adjacent regions 22 and 24 are matched to the light emitting diodes not shown in FIG. 3 adjacent to the light emitting diode 4. The angles of the kinks of adjacent sloping surfaces 8″ can differ from one another, as is shown in FIG. 3.

That light portion is in turn marked by B including a double arrow in FIG. 3 which passes through the regions 20 of the sloping surfaces 8″ and is thus directly incident onto the sensing region in the respective desired manner.

The light portion incident onto the adjacent step regions 16′ is minimal in the embodiment in accordance with FIG. 3 so that practically no light loss occurs here.

The light portions passing through the regions 22, 24 of the sloping surfaces 8″ basically not associated with the light emitting diode 4 are marked by C including a double arrow in FIG. 3 and a larger part thereof reaches the sensing region so that these radiation portions are not lost.

The step plate 2″ in accordance with FIG. 3 can also be made rotationally symmetrically in the manner such as was already explained in connection with FIG. 2.

Figure 4:
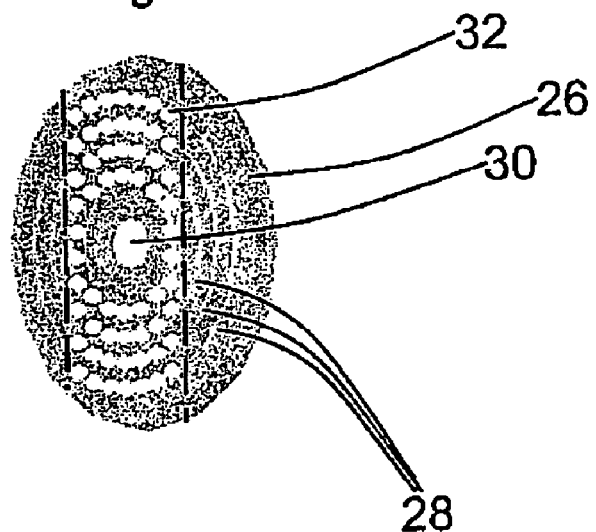
FIG. 4 illustrates a three-dimensional representation of a step plate in accordance with the invention with light emitting diodes arranged in front of it.

FIG. 4 shows a three-dimensional elementary representation of a rotationally symmetrical step plate 26 having concentric wedge rings 28 which surround a central region 30 of the step plate 26. The central region 30 is made as a piano-parallel plate so that it can be associated with an optical receiving system 14 in accordance with FIGS. 2 and 3 without influencing the radiation entering into the optical receiving system 14 in a relevant manner. Alternatively, the central region 30 can also be made as a passage hole with the same effect. A design as a receiving lens or as a lens region of an optical receiving system is also possible.

The wedge rings 28 concentrically surrounding the central region 30 are provided opposite rings of light emitting diodes 32 which are likewise arranged concentrically around the central region 30, with the light emitting diodes 32 each being located opposite a step formed between two wedge rings 28 in accordance with FIG. 3. The light emitting diodes 32 are disposed within a substantially rectangular field such as corresponds to the customary construction of optoelectronic sensors. This means that, when the step plate 26 in accordance with FIG. 4 is used, it is sectioned along the lines shown as broken lines in FIG. 4 so that the step plate 26 ultimately also has the shape of a rectangle.

Figure 5:
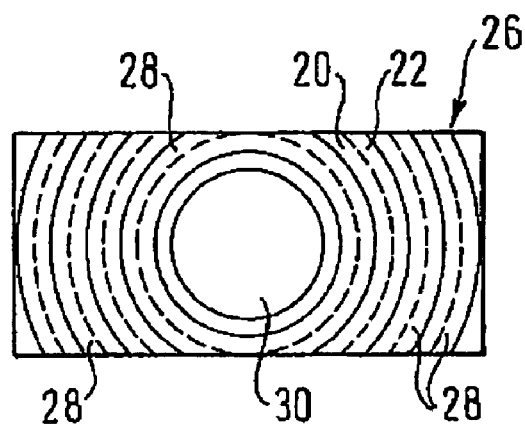
FIG. 5 illustrates a plan view of a step plate in accordance with the invention.

A step plate of this type is shown in plan view in FIG. 5. The central region 30 which is surrounded by concentric rings 28, of which, however, the outer ones are incomplete due to the rectangular shape of the step plate 26, can easily be recognized. In FIG. 5, the kinks present in the sloping surfaces 8″ in accordance with FIG. 3 are shown by broken lines and, for example, separate the region 20 in accordance with FIG. 3 from the region 22 in accordance with FIG. 3.

The description of the invention is merely exemplary in nature and, thus, variations that do not depart from the gist of the invention are intended to be within the scope of the invention. Such variations are not to be regarded as a departure from the spirit and scope of the invention.

REFERENCE NUMERAL LIST 2 step plate
2′ step plate
2″ step plate
4 light emitting diodes
6 wedge plates
8 sloping surfaces
8′ sloping surfaces
8″ sloping surfaces
10 end faces
10′ end faces
12 region
14 optical receiving system
16 step region
16′ step region
18 step region
20 region
22 region
24 region
26 step plate
28 wedge rings
30 central region
32 light emitting diodes

What is claimed is:

1. An optoelectronic sensor, comprising:
an integrated arrangement of a plurality of light emitting diodes arranged in a region of an optical receiving system for illuminating a sensing region; and
a beam-shaping optical element formed in a uniform step plate and associated with the light emitting diodes, wherein the beam-shaping optical element is comprised of precisely one wedge element or regions of up to four adjacent wedge elements firmly connected to one another are associated with each of the light emitting diodes, the wedge elements having a wedge shape defined by at least one inclination of a sloped surface and having have optical properties which differ from one another and which are dependent on their positions relative to the optical receiving system, wherein the wedge elements include a plurality of wedge rings provided in the step plate and adjoining one another directly.

2. An optoelectronic sensor in accordance with claim 1, wherein at least some of the wedge elements are designed for deflecting light radiated by the respective light emitting diodes into the direction of an optical axis of the optical receiving system.

3. An optoelectronic sensor in accordance with claim 1, wherein the wedge element associated with a light emitting diode is made as precisely one wedge plate having a sloping surface which is provided at a side facing the light emitting diode and/or at the side of the wedge plate remote from the light emitting diode.

4. An optoelectronic sensor in accordance with claim 3, wherein in order to achieve a respectively required illumination profile, the inclination of the sloping surface of each wedge plate is matched individually to a relative position between the respectively associated light emitting diode and the optical receiving system in two directions perpendicular to one another.

5. An optoelectronic sensor in accordance with claim 1, wherein the wedge element associated with a light emitting diode is made as a section of precisely one of a wedge strip and a wedge ring having at least one sloping surface, which is provided at one of a side facing the light emitting diode and a side of the wedge element remote from the light emitting diode.

6. An optoelectronic sensor in accordance with claim 3, wherein one of the wedge element is aligned with the respectively associated light emitting diode such that the light transmitted by this light emitting diode passes as completely as possible through the sloping surface of the respective wedge element.

7. An optoelectronic sensor in accordance with claim 1, wherein the wedge element associated with a light emitting diode is made as sections of a plurality of mutually adjoining wedge strips or wedge rings.

8. An optoelectronic sensor in accordance with claim 7, wherein the wedge elements are aligned with the respectively associated light emitting diode such that approximately half the light transmitted by this light emitting diode passes through the sloping surface of a first wedge element and the other half passes through the sloping surface of an adjoining second wedge element.

9. An optoelectronic sensor in accordance with claim 7, wherein the sloping surface of each wedge element is formed by two sections extending parallel to one another and having inclinations different from one another, with in particular each of the two sections forming approximately half of the sloping surface.

10. An optoelectronic sensor in accordance with claim 9, wherein the two sections merge steplessly into one another.

11. An optoelectronic sensor in accordance with claim 3, wherein an end face of the wedge element has no sloping surfaces and extends perpendicular to a main radiation direction (A) of the light emitting diode.

12. An optoelectronic sensor in accordance with claim 1, wherein the step plate is made as an injection molded part, in particular a post-processed injection molded part.

13. An optoelectronic sensor in accordance with claim 1 wherein the step has a rectangular shape such that at least some of the concentric wedge rings are only present incompletely on the step plate.

14. An optoelectronic sensor, comprising:
an integrated arrangement of a plurality of light emitting diodes arranged in a region of an optical receiving system for illuminating a sensing region; and
a beam-shaping optical element formed in a uniform step plate and associated with the light emitting diodes, wherein the beam-shaping optical elemente is comprised of precisely one wedge element or regions of up to four adjacent wedge elements firmly connected to one another are associated with each of the light emitting diodes, the wedge elements having a wedge shape defined by at least one inclination of a sloped surface and having have optical properties which differ from one another and which are dependent on their positions relative to the optical receiving system, wherein the wedge element associated with a light emitting diode is made as sections of a plurality of mutually adjoining wedge strips or wedge rings and the wedge elements are aligned with the respectively associated light emitting diode such that approximately half the light transmitted by this light emitting diode passes through the sloping surface of a first wedge element and the other half passes through the sloping surface of an adjoining second wedge element, where the sloping surface of each wedge element is formed by two sections extending parallel to one another and having inclinations different from one another, with each of the two sections forming approximately half of the sloping surface.

* * * * *